United States Patent Office 3,469,205
Patented Sept. 23, 1969

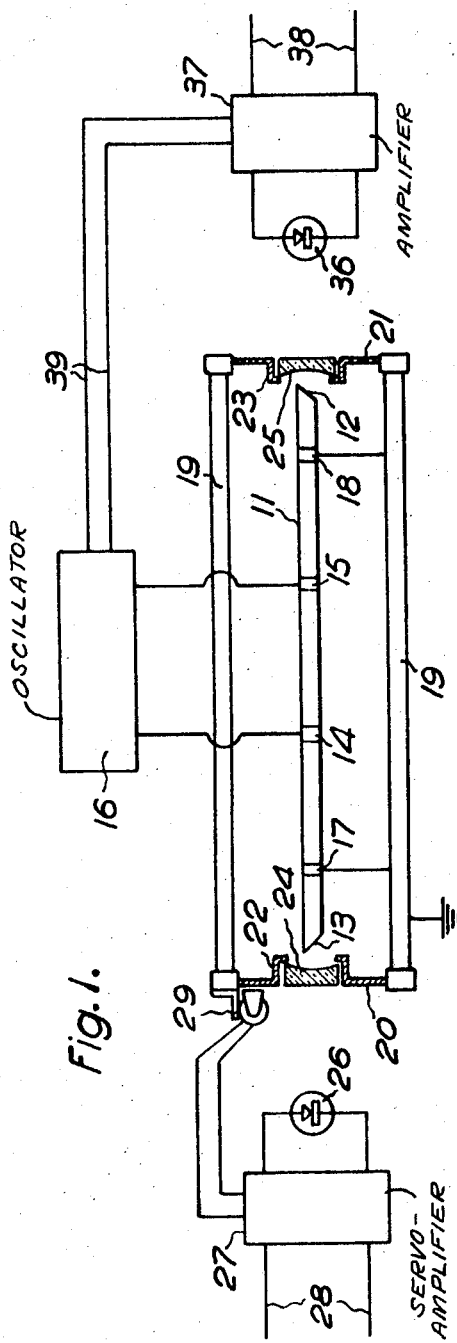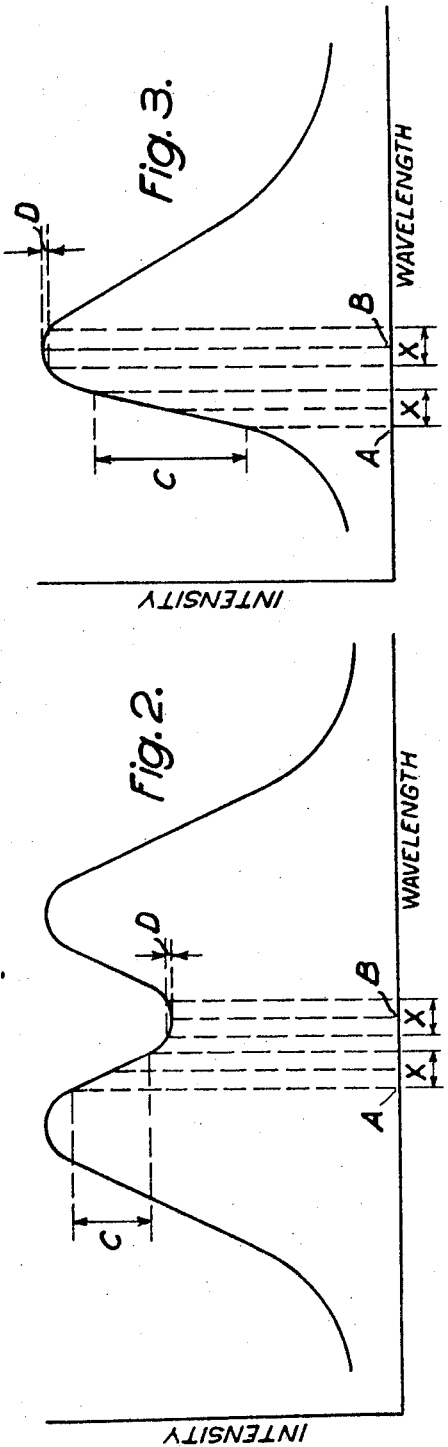

3,469,205
CONTROL OF OPTICAL MASERS OR LASERS
Alan Hugh Cook, William Richard Charlton Rowley, and David Charles Wilson, Teddington, England, assignors to National Research Development Corporation, London, England, a corporation of Great Britain
Filed May 7, 1964, Ser. No. 365,831
Claims priority, application Great Britain, May 7, 1963, 18,066/63
Int. Cl. H01s 3/05
U.S. Cl. 331—94.5
17 Claims

ABSTRACT OF THE DISCLOSURE

A method and apparatus for stabilizing the wave length of the output of a maser wherein the properties of the maser are cyclically varied over a small range. The change in intensity resulting from the cyclical modification is detected and employed to modify the properties of the optical resonator in such a manner that the intensity of radiation produced is shifted towards a minimum rate of change with respect to the wave length.

---

This invention relates to the control of the ouput of an optical maser, or laser, more especially to the control of the wave length at which the outgoing radiation is generated.

In a continuously operated gas maser or laser the output may vary in intensity and to some extent in wave length. Where the maser is to be used as a wave length standard, it is naturally desirable that any change in wave length of the output be reduced to a minimum.

According to the invention the wave length of the radiation generated by a continuous maser is stabilised by cyclically modifying through a small range the properties of an optical resonator associated with said maser, detecting and deriving a signal from the variations in radiation intensity resulting from the cyclical modification and employing such signal to modify the properties of the said optical resonator in such a manner that the intensity of the radiation produced is shifted towards a minimum rate of change with respect to the wave length.

If the active gas in the maser is a single isotope, as will be shown, the modification of the resonator produced by the signal may conveniently be towards a minimum within certain limits of intensity with respect to wave length, but in general with active gases such as a naturally occurring gas or a gas mixture the shift would be towards a maximum and it is also desirable in such cases to operate at low intensity levels.

The cyclical modification in general involves vibration of the optical cavity of the maser; this imparts a frequency modulation to the maser output and the band width of the emission is effectively broadened. For some purposes this may be undesirable. Since the total range of variation with which the invention deals is very small and generally of slow rate, the undesirable broadening of the band width can be dealt with by suppressing at controllable intervals the action of the signal for short periods of controllable length without affecting the average length of the optical cavity. Alternatively the frequency modulation may be eliminated by employing a second laser, the optical cavity of which is not vibrated controlled relative to the first using the mutual beat frequency as the control signal.

Figure 4:
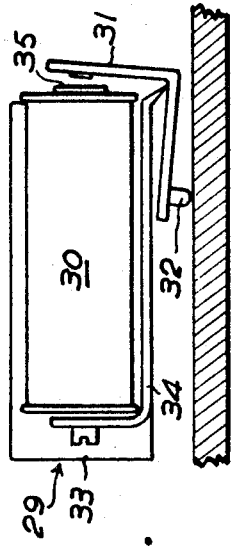
Figure 5:
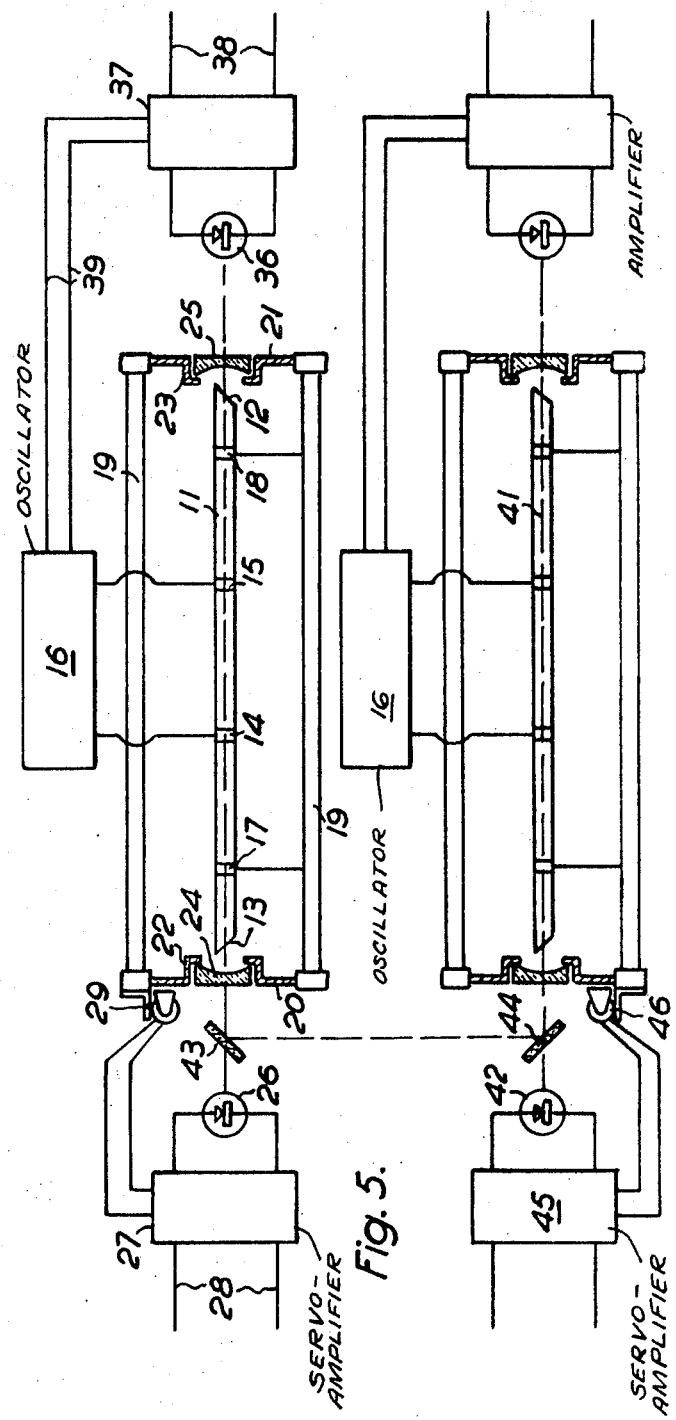

The invention will be further described with reference to the accompanying highly diagrammatic drawings, in which FIGURE 1 is a diagrammatic representation of an optical gas maser according to the invention, FIGURE 2 is an idealized representation of one form of characteristic curve relating the intensity of radiation produced by the maser with the wave length at which it is produced, which may be obtained in the case of an active gas consisting of a single isotope, FIGURE 3 is a similar curve to FIGURE 2 having more general application and such as is obtained with mixtures of isotopes such as naturally occurring gases and gas mixtures, FIGURE 4 is a detail view of part of FIGURE 1, and FIGURE 5 is a diagrammatic representation of a modification.

FIGURE 1 shows the invention applied to a continuously operated gas maser. The gas is enclosed in a tube 11, with angled ends 12, 13, to minimise unwanted reflections. The gas is excited or pumped, through electrodes 14, 15, from an oscillator 16 which may operate, for example at 30 mc./s. Electrodes 17, 18 are connected to earth. Alternatively the gas tube may be fitted with internal electrodes to permit operation with alternating or direct current. Tube 11 is supported in a frame consisting of bars 19 and end plates 20, 21. The bars 19 are made of a material such as Invar in order to minimise dimensional changes with varying temperature. Each of the end plates 20, 21 has a central aperture, 22, 23. In each aperture is mounted a mirror, 24, 25. These mirrors may be plane or have slightly concave inner surfaces and they are mounted concentrically with the tube 11. The inner surfaces are reflecting to such an extent that they pass only a small percentage of the incident light, for example 0.2%. The gas tube and mirrors together with the pump constitute an optical gas maser device of known kind.

Such a maser generates radiation at a frequency which lies within a range determined by the nature of the atoms in the maser material and which within that range is fixed primarily by the dimensions of the resonator associated with the maser, in this instance the separation of the two mirrors 24, 25. The intensity of the radiation produced—other things such as excitation power remaining the same—varies with the wave length in the manner indicated in FIGURE 2 or FIGURE 3 according to the nature and condition of the active gas and whether it is a single isotope or is a mixture of isotopes such as a naturally occurring gas or an artificial mixture.

The curve shown in FIGURE 2 is substantially symmetrical with steep flanks but instead of reaching a central maximum there is a central dip which though scarcely perceptible when the maser is working only just above threshold level, becomes increasingly evident as the output intensity is increased.

In the case of a gas containing a mixture of isotopes as shown in FIGURE 3, the curve is asymmetrical and although there is a dip it is no longer at the centre and in many cases is not readily observable, so that there is a well marked maximum at the centre. The shape of the curve alters slightly with changes of output intensity.

In either case the maser will operate in general at some wave length which may lie anywhere on the flanks of the characteristic curve. The wave length is therefore indeterminate. The invention serves to stabilise the operation at a value determined by the properties of the gas.

To this end the wave length is caused to vary cyclically over a small range X, in a manner which will be described. As long as operation is on the flank of the curve, this is accompanied by a large variation in the intensity of radiation produced. The cyclical variation in output is detected photoelectrically and through conventional servo circuits a signal is generated that is applied to alter the dimensions of the optical resonator in such a way that the wave length is displaced towards a point of the characteristic curve at which the rate of change of intensity with wave length is a minimum. As the wave length is displaced towards this point the cyclic variation in intensity falls, reaching a very small value at this point. Thus the detected signal also falls as this point is approached and the wave length is therefore stabilised at this point.

In the case of a maser characteristic curve having a central dip, the point B, the minimum of this central dip is the one towards which the displacement should preferably be effected. To operate in this way however the conditions must be such that the maser if left uncontrolled according to the invention, it operates at some wave length such as A on the flanks of the dip at which the variation of intensity C is large for the small cyclic variation X of the wave length, while at the point B the variation of intensity D is very small for the same cyclic variation of wave length X.

In the case where the characteristic curve does not have a central dip but is asymmetrical with a single maximum at B, the signal obtained when operating at A where the value of C is high must cause displacement towards B where again the variation D is very small. This would apply for example with a 5:1 mixture of helium and neon in the maser.

In either case, suitable use in the servo-mechanism of phase-sensitive circuits will ensure that the appropriate point on the curve is always sought.

As above mentioned, in the case of a characteristic curve with a central dip, the dip is less marked at low intensities. Thus the above method of seeking the minimum is more appropriate to high intensities of operation. If low intensities are desired the method of seeking a maximum may be employed, conditions being established so that in the absence of control the maser will operate on one flank outside one of the two maxima. Also as above mentioned, in the case of a characteristic curve without a central dip the shape of the curve alters slightly with changes of output intensity and this causes a corresponding change in the wave length at which stabilization occurs. For this reason it is generally preferable to operate at low intensity levels.

Referring again to FIGURE 1 for a specific embodiment of servo control, light emerging to the left of mirror 24 falls upon a photo-electric device 26 which may be a photodiode or a photomultiplier.

The output of device 26 is taken to a servo-amplifier indicated by the block 27 and supplied with power through leads 28. The output of the servo-amplifier is led to an electromagnetic device 29 (see also FIGURE 4). This is mounted on a rigid abutment 33. The servo-amplifier output passes through operating coil 30 and a magnetic flux is set up through armature 31, yoke 34 and core 35. Armature 31 carries a stud 32 which bears against the end plate 20 of the optical assembly. When the current through 30 increases, the armature is more strongly attracted and the stud 32 exerts a greater force on plate 20. This causes a small change in the separation of the mirrors 24, 25, the change being due to elastic distortion of plate 20. It has been found convenient to allow for a total change of about 2 microns in the separation of the mirrors although normally only a fraction of this will be employed. The current driven by the servo amplifier through coil 30 is D.C. Superimposed upon this is an A.C. which provides the cyclic variation in wave length. The amplitude of vibration imparted to the mirror 24 is suitably of the order of $\frac{1}{10}$ wave length, about $\frac{1}{20}$ micron in this specific example. In this instance, vibration and correction are effected by the same device on the same mirror. But the same effect could be produced by vibrating one mirror and applying the steady correcting force to the other. A suitable frequency of vibration has been found to be 350 c./s. but the frequency can conveniently lie anywhere in the range up to 1 mc./s.

A simple electromagnetic device has been shown for both vibrating and adjusting the mirror. For such a device might be substituted one employing the principle of the moving coil, or magneto striction, or piezo-electric effect.

In FIGURE 1 is shown a second photo electric device, e.g. a photodiode, 36. This receives light emerging from the maser through mirror 25. Connected to 36 is an amplifier 37 having power supplied through leads 38, which controls the operation of oscillator 16 through output leads 39. This serves to stabilise the intensity of the maser output by control of the excitation. This does not conflict with the wave length control servo since the latter seeks not a minimum or maximum intensity directly but a minimum amplitude of a cyclic change of intensity.

The wave length servo-control is able to compensate for small changes in dimension of the maser structure, caused principally by temperature changes acting on the bars 19. The servo can be relieved to a very large extent of this duty if for solid bars 19 are substituted Invar or like tubes of adequate wall thickness. Through these tubes may be circulated water or oil from a thermostat bath held a few degrees above ambient average temperature.

In the embodiment illustrated in FIGURES 1 and 4, the optical resonator comprises two mirrors, 24, 25, one, (or both) of these mirrors being vibrated in the operation of the control system. This vibration imparts a frequency modulation to the maser output and the band width of the emission is effectively broadened. The amount of the modulation is small and does not upset interferometric work over paths of several metres. For radio frequency beat experiments or for interferometry over longer paths however the effect becomes important.

The difficulty can be overcome by the use of a more elaborate servo system which provides for suppression at predetermined intervals of the mirror vibration for short periods of controllable length without affecting the average length of the optical cavity. The length of time for which control would be interrupted depends upon mechanical and thermal stability, but may exceed a minute.

As an alternative to interrupting the control a second maser the tube of which is indicated at 41 in FIGURE 5 may be employed to provide the emission to be used. The first maser and its associated control are the same as those in FIGURE 1 and the parts therefore bear the same references as FIGURE 1 and need not be described again. The second maser not only supplies the emission to be used but also excites a photo-electric device 42. Some of the radiation from the first maser also falls upon the photo-electric device 42 by way of the semi transparent reflectors 43 and 44. When the two beams of radiation are accurately aligned the output of the device has a component corresponding to the difference between the frequencies of the two beams. This beat frequency constitutes a control signal which is applied to a servo-amplifier indicated by the block 45 which controls the length of the resonator of the second maser through a device 46 so as to make the optical frequency of the second maser the same as the mean optical frequency of the first maser. Thus the frequency of the second maser is stabilized without the length of its optical cavity being vibrated and its output is free from frequency modulation. By this means a wave length reproduceability of one or two parts in $10^8$ is readily achieved.

What is claimed is:

1. A method of stabilizing the wave length of the output of a continuously operated optical gas maser which comprises continuously cyclically modifying through a small substantially constant range the frequency determining properties of an optical resonator associated with said maser, detecting and deriving a signal from the variations in radiation intensity resulting from the cyclical modification of the frequency determining properties, and applying such signal to modify the frequency determining properties of said optical resonator such that the intensity of the radiation produced is shifted towards a value at which the change in intensity for a given change in wave length is at a minimum.

2. A method as set forth in claim 1 in which the active gas in the maser is a single isotope and the modification produced by the signal shifts the intensity of the radiation produced towards the central minimum of intensity in the intensity/wave length characteristic of the maser.

3. A method as set forth in claim 1 in which the active gas in the maser is a mixture of isotopes and the modification produced by the signal shifts that intensity of radiation produced towards the maximum of intensity in the intensity/wave length characteristic of the maser.

4. A method as set forth in claim 3 including operating said maser at a low intensity level.

5. A method as set forth in claim 1 in which the action of the signal is suppressed for short periods of controllable length at controllable intervals, without affecting the average wave length.

6. A method as set forth in claim 1 also including the steps of continuously operating a second optical gas maser, beating the frequency of said maser with that of said second maser, and controlling the frequency of said second maser from the beat frequency in such sense as to cause the frequency of said second maser to approach that of said maser.

7. The combination with a continuously operated optical gas maser of an optical resonator which determines the frequency of operation of the maser, means for stabilizing the wave length of the output of the maser, comprising means for continuously cyclically modifying the properties of the resonator through a small substantially constant range, means for detecting and deriving a signal from the variations in radiation intensity resulting from the cyclical modification of the frequency determining properties of the resonator, and means actuated by the signal for modifying the frequency determining properties of the resonator such that the intensity of the radiation produced is shifted towards a value at which the change in intensity for a given change in wave length is at a minimum.

8. A combination as set forth in claim 7 in which the active gas in the maser is a single isotope and said means actuated by the signal seeks the central minimum value of the intensity/wave length characteristic of the maser.

9. A combination as set forth in claim 7 in which the active gas in the maser is a mixture of isotopes and said means actuated by the signal seeks the maximum value of the intensity/wave length characteristic of the maser.

10. A combination as set forth in claim 7 in which said optical resonator comprises two mirrors at opposite ends of the maser tube held at a controlled distance apart, and wherein both said cyclic modifying means and said signal actuated means, modify the spacing of the mirrors.

11. A combination as set forth in claim 7 in which said cyclical modifying means includes a device responsive to an alternating current to produce a mechanical force which imposes an elastic stress on the mounting of the mirrors.

12. A combination as set forth in claim 7 in which said detecting and signal deriving means produces an electrical signal deriving actuated means includes a device responsive to said signal to produce a mechanical force which imposes an elastic stress on the mounting of the mirrors.

13. A combination as set forth in claim 12 in which one and the same electric current responsive device serves both purposes.

14. A combination as set forth in claim 11 in which the electric current responsive device is an electromagnet.

15. A combination as set forth in claim 7 in which the means for deriving a signal from the variation in radiation intensity includes a photo-electric device, means for directing a small proportion of the radiation emitted by the maser on the photo-electric device, and a servo amplifier to which the output of the photo-electric device is taken.

16. A combination as set forth in claim 7 also including means for suppressing at intervals of predetermined length the operation of the signal actuated means for short periods of controllable length.

17. A combination as set forth in claim 7 also including a second continuously operated optical gas maser, means for deriving a beat frequency signal from the frequencies of said maser and said second maser, and means actuated by the beat frequency signal for adjusting the frequency of said second maser in a direction to reduce the beat frequency.

References Cited

UNITED STATES PATENTS

| 3,170,122 | 2/1965 | Bennett | 331—94.5 |
| 3,252,110 | 5/1966 | Gustafson et al. | 331—94.5 |

RONALD L. WIBERT, Primary Examiner